US012571757B2

(12) United States Patent
Lawrence et al.

(10) Patent No.: US 12,571,757 B2
(45) Date of Patent: Mar. 10, 2026

(54) ELECTROCHEMICAL pH SENSOR

(71) Applicant: ANB Sensors Ltd, Cambridgeshire (GB)

(72) Inventors: Nathan Lawrence, Cambridgeshire (GB); Steven A. Gahlings, Cambridgeshire (GB); Kay Louise McGuinness, Cambridgeshire (GB); Monica Miranda, Cambridgeshire (GB)

(73) Assignee: ANB Sensors Ltd, Cambridgeshire (GB)

( * ) Notice: Subject to any disclaimer, the term of this patent is extended or adjusted under 35 U.S.C. 154(b) by 410 days.

(21) Appl. No.: 18/246,325

(22) PCT Filed: Sep. 23, 2021

(86) PCT No.: PCT/EP2021/076276
§ 371 (c)(1),
(2) Date: Mar. 22, 2023

(87) PCT Pub. No.: WO2022/063936
PCT Pub. Date: Mar. 31, 2022

(65) Prior Publication Data

US 2023/0324325 A1 Oct. 12, 2023

(30) Foreign Application Priority Data

Sep. 23, 2020 (GB) ...................................... 2015037

(51) Int. Cl.
*G01N 27/30* (2006.01)
*G01N 27/416* (2006.01)
*G01N 27/48* (2006.01)

(52) U.S. Cl.
CPC ......... *G01N 27/302* (2013.01); *G01N 27/308* (2013.01); *G01N 27/4167* (2013.01); *G01N 27/48* (2013.01)

(58) Field of Classification Search
CPC ............... G01N 27/302; G01N 27/308; G01N 27/4167; G01N 27/48
See application file for complete search history.

(56) References Cited

U.S. PATENT DOCUMENTS 5,223,117 A 6/1993 Wrighton et al.
2011/0048969 A1* 3/2011 Lawrence ............ G01N 27/302 427/78

(Continued)

FOREIGN PATENT DOCUMENTS

CN 109219746 A 1/2019
EP 2660588 B1 9/2016

(Continued)

OTHER PUBLICATIONS

Millipore Sigma Flavanone 98 487-26-3 product description, downloaed Jul. 1, 2025 from https://www.sigmaaldrich.com/US/en/product/aldrich/102032?srsltid=AfmBOookWEUruUPxuQ78DmltKaz6PUCv7-zp4xx-EMNx9Awa4KyMJJOj (Year: 2025).*

(Continued)

*Primary Examiner* — Alexander S Noguerola
(74) *Attorney, Agent, or Firm* — MUGHAL GAUDRY & FRANKLIN PC

(57) ABSTRACT

A composite working electrode comprising at least one polysulfone coated carbon material and at least one active redox species comprising an oxygen family atom bound in a ring structure, wherein the ring structure is substituted with a carbon ring, and wherein a moiety containing a hydrogen atom is attached to the carbon ring such that it is configured to provide for hydrogen bonding with the bound oxygen (Continued)

family atom and an electrochemical sensor comprising said composite working electrode.

19 Claims, 5 Drawing Sheets

(56) References Cited

U.S. PATENT DOCUMENTS

| | | | | |
|---|---|---|---|---|
| 2014/0332398 | A1 * | 11/2014 | Lawrence | G01N 27/4167 205/333 |
| 2014/0367277 | A1 | 12/2014 | Crawford et al. | |
| 2019/0178831 | A1 | 6/2019 | Lawrence | |

FOREIGN PATENT DOCUMENTS

| | | | | | |
|---|---|---|---|---|---|
| GB | 2550951 | A | * | 12/2017 | G01N 27/30 |
| GB | 2550959 | A | * | 12/2017 | G01N 27/30 |
| WO | 2012017306 | A2 | | 2/2012 | |

OTHER PUBLICATIONS

Dai, C. et al., “A novel sensor based on eletropolymerized substituted-phenol for pH detection in unbuffered systems”, RSC ADV., vol. 5, No. 126, pp. 104048-104053, Jan. 1, 2015.

Li, B. et al., “Sensitive HIV-1 detection in a homogenous solution based on an electrochemical molecular beacon coupled with a nafion (RTM)-graphene composite film modified screen-printed electrode”, Biosensors and Bioelectronics, vol. 52, pp. 330-336, 2014.

Al-Qasmi et al., “An enhanced electrocatalytic oxidation and determination of 2,4-dichlorophenol on multilayer deposited functionalised multi-walled carbon nanotube/Nafion (RTM) composite film electrode”, Arabian Journal of Chemistry, vol. 12, 2019, pp. 946-956.

Q. Tang et al., “Nafion coated sulfur-carbon electrode for high performance lithium-sulfur batteries”, Journal of Power Sources, vol. 246, 2014, pp. 253-259.

* cited by examiner (A)

(A-1)

(B)
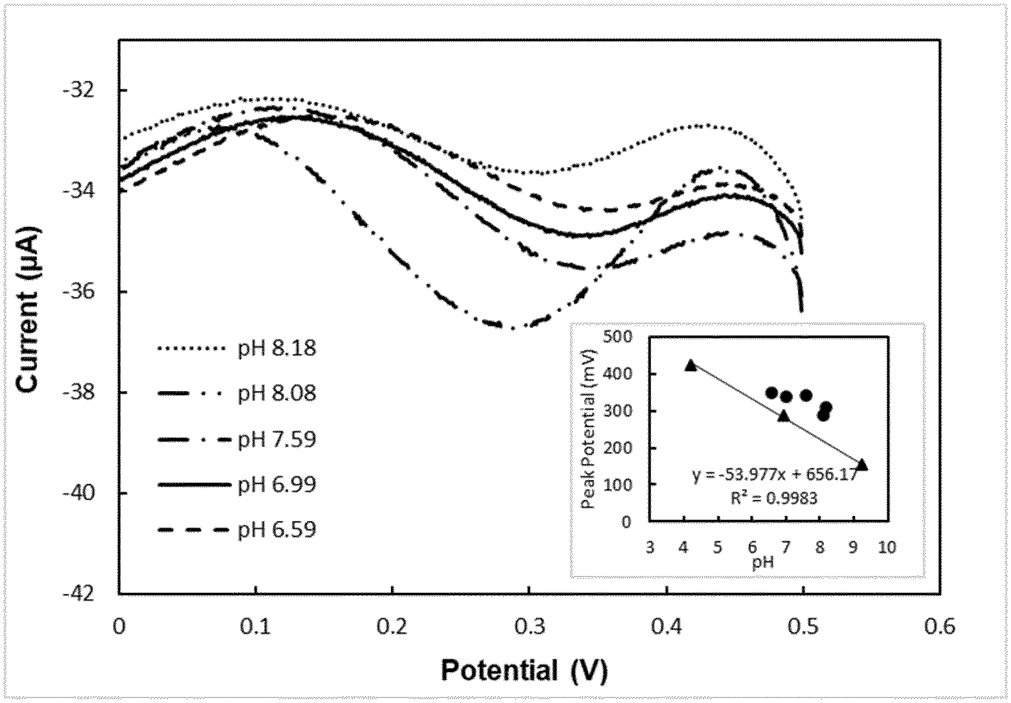
FIGURE 2:
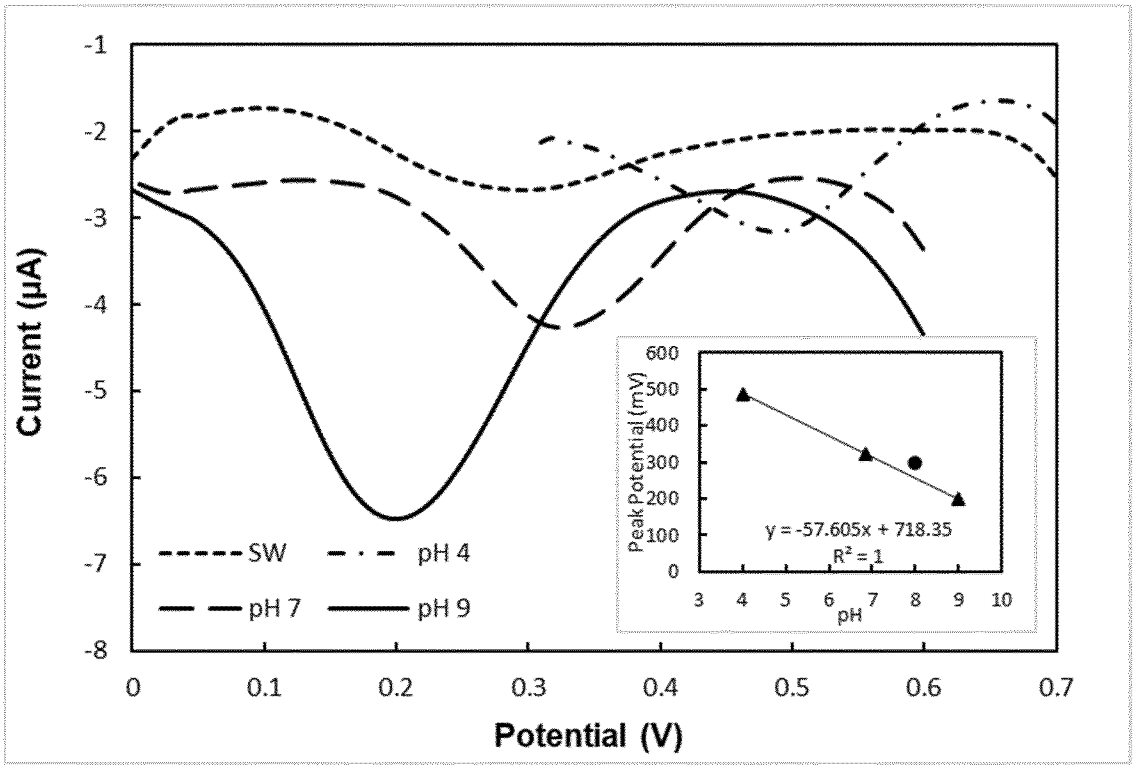

ELECTROCHEMICAL pH SENSOR

CLAIM OF PRIORITY

This Application is a National Stage Entry of, and claims priority to, PCT Patent Application No. PCT/EP2021/076276, filed on Sep. 23, 2021 and titled "ELECTROCHEMICAL PH SENSOR", which claims the benefit of and priority to GB Patent Application No. 2015037.1, filed Sep. 23, 2020, both of which are incorporated by reference in their entirety for all purposes.

BACKGROUND

Embodiments of the present application provide a composite working electrode, an electrochemical sensor comprising said composite working electrode for electrochemical pH sensing using a chemistry/redox active species configured to provide for hydrogen bonding with a moiety fixed in a carbon ring.

In chemistry, pH is a numeric scale used to specify the acidity or basicity (alkalinity) of an aqueous solution. It is approximately the negative of the logarithm to base 10 of the molar concentration, measured in units of moles per liter, of hydrogen ions. More precisely, it is the negative of the logarithm to base 10 of the activity of the hydrogen ion. Solutions with a pH less than 7 are acidic and solutions with a pH greater than 7 are basic. Pure water is neutral, being neither an acid nor a base.

pH measurements are important in agronomy, medicine, biology, chemistry, agriculture, forestry, food science, environmental science, oceanography, marine research, civil engineering, chemical engineering, nutrition, water treatment, water management (including water resource management and wastewater management), and water purification, as well as many other applications.

For nearly a century, pH has most commonly been measured using a glass electrode. The glass electrode is a combination electrode that combines both a glass and a reference electrode into one body.

The combination electrode consists of the following parts:

- a sensing part of the electrode, a bulb made from a specific glass; an internal electrode, usually silver chloride electrode or calomel electrode; an internal solution, usually a pH=7 buffered solution of 0.1 mol/L KCl or $1\times10^{-7}$ mol/L HCl;
- a reference electrode, usually the same type with a reference internal solution, usually 0.1 mol/L KCl;
- a junction with studied solution, usually made from ceramics or capillary with quartz fiber;
- and the body of electrode, made from non-conductive glass or plastics.

Glass electrodes cannot be used in many industries because of the glass electrode's fragility, the requirement that the glass electrode be regularly calibrated due to reference electrode drift, and the need for the glass electrode to be stored under appropriate conditions.

A number of chemical analysis tools are known from chemical laboratory practice. Such known analysis tools include for example the various types of chromatography, electrochemical and spectral analysis. Particularly, the potentiometric method has been widely used for the measurements of water composition both in the laboratory and in the field of ground water quality control. U.S. Pat. No. 5,223,117 discloses a two-terminal voltammetric microsensor having an internal reference using molecular self-assembling to form a system in which the reference electrode and the indicator electrode are both on the sensor electrode. The reference molecule is described as a redox system that is pH-insensitive, while the indicator molecule is pH sensitive and is formed by a hydroquinone based redox system having a potential that shifts with the pH. Both, reference molecule and indicator molecule layers are prepared by self-assembly on gold (Au) microelectrodes. In the known micro-sensor, a pH reading is derived from peak readings of the voltammograms.

Recently there has been significant work in the development of pH sensors for use in the water industry, where the concentration of dissolved buffer and/or ionic salt is low. Interest in this area stemmed from the work by Compton et al., who showed the use of classical quinone/hydroquinone voltammetry to monitor pH in these systems failed. Compton established that the proton coupled electrochemical process perturbed the pH of the solution locally to the electrode as the redox process consumes or releases protons, when little or no buffer and/or ionic salt was in the analyte solution.

To this end work by Lawrence et al. has shown that this issue can be mitigated by the use of a variety of quinone and phenol based systems, which provide a means of internal hydrogen bonding of the proton being transferred in the electrochemical process. It was shown that dihydroxyanthraquinone and alizarin were suitable for the quinone systems, where the keto moiety closest to the —OH moiety allowed the facilitation of the proton coupled electron transfer and providing a means for the reaction to follow a concerted rather than non-concerted mechanism. Further to these results it was shown that oxidation of phenol species containing moieties holding keto groups in the 2-position of the benzene ring, salicyaldehyde as an example, provided an electroactive polymer species which is pH active and able to measure pH in low buffered media, such as water. For purposes of this disclosure the terms low buffer/low buffering capacity may be used interchangeably. A variety of derivatives were tested and claimed including the aldehyde, ester and nitrogen based compounds.

Further, electrodes have been reported, in which the redox system is incorporated into a support material. As a support material, carbon-based materials are widely used and thus carbon-based electrodes are widely used in electrochemistry and broadly studied owing to their desirable chemical and physical properties, low cost and commercial availability, as well as their suitability for chemical modification. Carbon nanotubes in particular are now prevalent for electroanalytical applications.

Carbon structures are predominantly influenced by the presence of certain surface defects, which is essential for rapid electron transfer reactions. In the case of the carbon-nanotubes (CNTs), the presence of pentagonal or heptagonal carbon rings has been demonstrated to induce a chemical structure change, leading to 'Curved Carbon Nanotubes'. However, the major type of surface defect in CNTs occurs at the end of the graphene sheets, called "edge-plane" defects. Those defect sites are high energy defects, thus, they are chemically highly reactive, and consequently, an adequate site for electron-transfer reactions.

Although several synthetic methods have been developed for producing carbon nanotubes, the main techniques are: Arc-Discharge, Laser Vaporization and Chemical Vapor Deposition. Arc-discharge synthesis, also known as electric arc discharge, generates the highest quality carbon nanotubes, but whilst they are of a very high quality, they are also mixed with a large amount of amorphous carbon, which makes this technique difficult to scale up. In the laser-vaporization method, a pulsed laser is fired at a graphite target, which is usually placed at one end of a quartz tube in an inert environment, at high temperature and pressure. The nanotubes produced are easily controllable in shape and structure and very little amorphous carbon is produced, but it is highly inefficient with yields being small.

Thus, chemical vapor deposition (CVD) is the most promising method for the production of carbon nanotubes. In this process, a gas such as acetylene or ethylene, is passed over a metal nanoparticle catalyst (typically iron, nickel, or molybdenum) which has been deposited on a porous substrate (e.g. silica, alumina).

Carbon atoms dissociate from the gas molecules as they pass over the catalyst, rearranging on the surface to form nanotubes.

CVD produced CNT's have a significant number of edge plane defects which impacts their electrochemical reactivity compared to ARC produced CNT's. Those highly reactive chemical sites can react with atmospheric oxygen resulting in a variety of oxo groups such as hydroxyl and carboxyl functional groups. These functionalities can be introduced in the manufacture of the CNT to varying degrees and they can impact the electrochemical performance of the CNT. In certain media these functionalities can disrupt the environment local to the electrode surface compared to the bulk solution—carboxylate functionalities inducing a local acidic pH in unbuffered media being one such example.

Erroneous surface functionalization of carbon-based materials, especially multi-walled nanotubes, is thus a serious problem faced when trying to construct an accurate redox system based working electrode for an electrochemical sensor. A solution is thus needed which corrects these erroneous surface functionalizations.

As such, there has been a long-felt need for a novel electrochemical sensor, and in particular for a new method of determining pH, that overcomes these operational problems.

As well as measuring pH in water, there is also a need to measure pH in seawater. One important reason for measuring pH in saltwater is to monitor the effects of carbon dioxide in the atmosphere on the pH of the Oceans.

Ion-sensitive field-effect transistor (ISFET) based systems offer a solution for seawater applications but often have to be deployed with salinity sensors to understand reference potentials. Optical systems are also used in seawater, but they require deployment with optical dye bags which need to be replaced periodically.

As part of its operational definition of the pH scale, the IUPAC defines a series of buffer solutions across a range of pH values (often denoted with NBS or NIST designation). These solutions have a relatively low ionic strength (~0.1) compared to that of seawater (~0.7), and, as a consequence, are not recommended for use in characterizing the pH of seawater, since the ionic strength differences cause changes in electrode potential. To resolve this problem, an alternative series of buffers based on artificial seawater have been developed. This new series resolves the problem of ionic strength differences between samples and the buffers, and the new pH scale is referred to as the 'total scale', often denoted as pHT. The total scale was defined using a medium containing sulfate ions. These ions experience protonation, $$H^+ + SO_4^{2-} \rightleftharpoons HSO_4^-,$$

such that the total scale includes the effect of both protons (free hydrogen ions) and hydrogen sulfate ions:

$$[H^+]T = [H^+]F + [HSO_4^-].$$

Outside of water and seawater, there is a need to measure pH in low buffering capacity solutions, such as saline solutions in the medical industry, biological solutions in the pharmaceutical industry, food and beverage related solutions in the food and beverage industry, aquaculture solutions, solutions in the fish farming and hydroponic industries and the like.

The present invention addresses these needs.

DESCRIPTION

The ensuing description provides some embodiment(s) of the invention, and is not intended to limit the scope, applicability or configuration of the invention or inventions. Various changes may be made in the function and arrangement of elements without departing from the scope of the invention as set forth herein. Some embodiments maybe practiced without all the specific details. For example, circuits may be shown in block diagrams in order not to obscure the embodiments in unnecessary detail. In other instances, well-known circuits, processes, algorithms, structures and techniques may be shown without unnecessary detail in order to avoid obscuring the embodiments.

Reference will now be made in detail to embodiments, examples of which are illustrated in the accompanying drawings and figures. In the following detailed description, numerous specific details are set forth in order to provide a thorough understanding of the subject matter herein. However, it will be apparent to one of ordinary skill in the art that the subject matter may be practiced without these specific details. In other instances, well known methods, procedures, components, and systems have not been described in detail so as not to unnecessarily obscure features of the embodiments. In the following description, it should be understood that features of one embodiment may be used in combination with features from another embodiment where the features of the different embodiment are not incompatible.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step. The first object or step, and the second object or step, are both objects or steps, respectively, but they are not to be considered the same object or step.

The terminology used in the description of the disclosure herein is for the purpose of describing particular embodiments only and is not intended to be limiting of the subject matter. As used in this description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the present disclosure relate to a composite working electrode and to an electrochemical sensor comprising said working electrode for detecting and monitoring pH. More specifically, but not by way of limitation, embodiments of the present disclosure provide a pH sensor capable of measuring pH in solutions with a low buffering capacity, such as water, seawater, potassium chloride (KCl) solutions, sodium chloride (NaCl) solutions, biological media, food and beverage solutions, aquaculture solutions and/or the like, using a redox active chemistry/active redox species that is configured to provide for hydrogen bonding with a moiety fixed in a carbon ring.

In embodiments of the present disclosure, the redox active chemistry provides for hydrogen bonding between a hydrogen atom attached to a carbon ring, for example as part of a hydroxyl group or the like, and an oxygen family atom substituted into a carbon ring, where the oxygen family atom may comprise oxygen, sulphur, selenium or the like.

The electrode substrate comprises polysulfone coated carbon material, a polysulfone coated carbon derivative material and/or the like.

In embodiments of the present disclosure, the carbon material comprises any one of, or mixture of graphite, carbon nanotubes, glassy carbon, $C_{60}$, conducting boron doped diamond powder or other conducting carbon materials.

For purposes of this application the terms "buffer capacity", "buffering capacity" and "alkalinity" may be used interchangeably. Buffer capacity of a solution is defined as the moles of an acid or base necessary to change the pH of a solution by one (1) pH unit, divided by the pH change and the volume of buffer in liters; it is a unitless number. A buffer resists changes in pH due to the addition of an acid or base through consumption of the buffer. Solutions with a low buffer capacity include: water, seawater, saline solutions, pharmaceutical solutions—which generally have a low buffer capacity to prevent overwhelming the body's own buffer systems, biological media, which are often aqueous/saline solutions, some food and beverage solutions, aquaculture solutions and/or the like. By way of example, many solutions that contain a high percentage of water with non-active chemical species may have a low buffering capacity.

An issue with electrochemical sensors is the ability to make electrochemical measurements without a buffer and/or similar species that can facilitate proton transfer reactions, i.e. low buffer capacity solutions. Low buffer capacity/low buffer solutions essentially come in two different categories/types. The first type of low buffer capacity solution comprises a low electrolyte media/solution, such as pure water, drinking water, source water and/or the like. The second type of low buffer capacity solution comprises a high ionic strength solution media that is naturally buffered, but is unable to resist changes in local pH where proton transfer is unfacilitated, such as seawater, sodium chloride solutions, hard water, potassium chloride solutions, many pharmaceutical solutions, solutions of organic matter and/or the like.

A pH sensor is often tested and calibrated using buffer solutions, which have stable values of pH as a result of the buffer. The concentration of buffer in such a solution may be less than 0.25 molar of buffer, less than 0.2 molar of buffer, less than 0.15 molar, of buffer less than 0.1 molar of buffer or even of the order of 0.05 or 0.01 molar of buffer or less. Reference systems such as silver-silver chloride and calomel reference systems use reference solutions of sodium chloride (AgCl), potassium chloride (KCl) and/or the like that are low buffer capacity solutions. For example, the reference solutions may contain less than about 0.1 or even 0.01 molar of buffer.

In some embodiments of the present disclosure, a working electrode for an electrochemical pH sensor is provided comprising an active redox species. The working electrode is configured to generate a redox response that is sensitive to pH/hydrogen ion concentration in a low buffering capacity solution, such as water, seawater and/or the like. In embodiments of the present disclosure, the active redox species comprises an oxygen family atom bound in an ether bond in a ring structure. The ring structure in which the oxygen family atom is bound is substituted with a carbon ring, and a hydrogen atom attached to the carbon ring is configured so as to provide for hydrogen bonding with the bound oxygen family atom.

In some embodiments of the present disclosure, the ring structure and/or the carbon ring may comprise an electron withdrawing or an electron donating group. An electron withdrawing group draws electrons away from a reaction center. Examples of electron withdrawing groups include: halogens (F, Cl); nitriles CN; carbonyls RCOR'; nitro groups $NO_2$; and/or the like. An electron donating group releases electrons into a reaction center. Examples of electron donating groups include: alkyl groups; alcohol groups; amino groups; and/or the like.

In some embodiments of the present disclosure, a set of derivatives/active redox species for the electrochemical determination of pH in unbuffered media are provided, where the derivatives/active redox species are based on the formation of hydrogen bonding through a ring structure containing a substituted member of the oxygen family.

In some embodiments, ring structure containing the substituted member of the oxygen family is bound to/substituted with a phenol and the hydrogen bonding occurs between the substituted member of the oxygen family and the phenol proton. In some embodiments the ring structure may comprise a 5 or a 6 membered ring.

In some embodiments of the electrochemical pH sensor, the redox active pH sensing molecule (active redox species), in accordance with embodiments of the present application, is encapsulated into a polymer to provide enhanced stability and reproducible response to pH in a wide variety of low buffered media. This polymer species may promote proton transfer between the redox active species and the analysis media, aiding stabilization of the hydrogen bound intermediate.

Previous electrochemical pH sensors configured for operation in low buffering capacity have used oxygen that is either conjugated or part of a carbonyl to provide for hydrogen bonding with a phenol proton. Surprisingly, applicants have found that oxygen family atoms substituted in a carbon ring have more freedom of motion, such as an ability to freely rotate, compared to oxygen atoms that are either conjugated or part of a carbonyl, and this freedom of movement provides for better hydrogen bonding than previous pH chemistries. This improved hydrogen bonding provides the basis for a pH sensor for measuring pH in a low buffering capacity solution, where the pH sensor provides a more stable, more reproducible and more defined/sharper output than previous systems.

In some embodiments of the present disclosure, an oxygen atom forming the hydrogen bonding may be bound in an ether bond and, as such, is freely rotating with respect to the carbon atom with which bonding is designed to occur. It has been found that this free rotation provides for optimum hydrogen bonding with the phenol proton. In some embodiments of the present disclosure, the hydrogen bonding formation may be promoted by the fact that the ether bond forms part of a six membered ring, with a carbonyl moiety at the 4-position with respect to the ether oxygen, providing a degree of steric constraint on the positioning of the ring with respect to the phenyl ring. In some embodiments, an ether bond may form part of a five membered ring.

It has been found that groups may be added to the carbon ring containing the oxygen family member and/or the phenol to provide for changing the hydrogen bonding between the substituted oxygen family member and the phenol proton. In some embodiments of the present disclosure, the carbon ring containing the substituted oxygen family member and/or the phenol include active moieties to provide for polymerization.

In some embodiments, a working electrode comprising the active redox species, where the active redox species comprises a species configured to provide for formation of hydrogen bonding through a five (5) or a six (6) membered ring containing a substituted member of the oxygen family, may be part of an electrochemical sensor, such as a voltammetric pH sensor. In such embodiments, the working electrode comprises the redox active material that is capable of undergoing both electron and proton transfer.

By applying a potential to the working electrode, a measured potential (peak potential, half-wave potential, onset potential etc.) generated in response to the applied potential provides a measure of the pH of a solution contacting the working electrode. The measured potential being a function of the concentration of hydrogen ions in a solution being sensed, proximal to the active redox species in accordance with embodiments of the present disclosure. As stated previously, the active redox species, in accordance with embodiments of the present disclosure, is configured to generate a response that is dependent on the pH of the solution, where the solution is a low buffering capacity solution.

In tests, applicants have found that active redox species comprising a species configured to provide for formation of hydrogen bonding through a five (5) or a six (6) membered ring containing a substituted member of the oxygen family, in accordance with embodiments of the present disclosure, are capable of producing a response, redox current/potential, that corresponds to the pH of the solution where the solution has very low buffering capacity 0.05 molar buffer or less, or less than 0.01 molar buffer up to higher buffering capacity solutions, of the order of 0.2 molar buffer. While the active redox species in accordance with embodiments of the present application may produce a redox potential that corresponds to a pH of a solution with which it is contacted, the redox active species are configured to produce a redox active potential corresponding to pH of the solution in solutions with very low molar buffer, such as 0.01 molar buffer or less.

In some embodiments, the electrode potential applied to the working electrode may be swept linearly, step-wise or via a pulse technique and the current recorded. The electrochemical sensor may, in some embodiments, comprise a reference electrode that includes an inactive redox species. For example, the solution contacting the working and reference electrodes may comprise a solution with a low buffering capacity and the inactive redox species may comprise: quinone/benzoquinone, phenol based polymers, anthraquinone, napthaquinone, bare carbon, carbon with an active surface and/or the like. The low buffering capacity solution, may comprise water, a saline solution and/or the like, and the reference electrode may comprise an acidic active redox species, a basic redox species, an anthraquinone, an anthraquinone derivative, a quinone, a quinone derivative, a carbon substrate with a low volume of redox active centers derivatized thereon and/or the like.

In some embodiments, the oxygen family atom of the active redox species comprises an oxygen atom, a sulphur atom or a selenium atom.

In some embodiments, the hydrogen atom is part of a hydroxyl group attached to the carbon ring.

In some embodiments, the carbon ring comprises a phenol.

Embodiments of the present disclosure provide a new set of derivatives/active redox species for the electrochemical determination of pH. More particularly, but not by way of limitation, the derivatives/active redox species may be used in a pH sensor for use in low electrolyte media consistent with the conditions found in drinking water, source water and/or the like and/or high ionic strength media that are naturally buffered, but are unable to resist changes in local pH where proton transfer is unfacilitated. The active redox species of the present disclosure are configured to promote proton exchange at a surface of a sensing electrode of a pH sensor system such that the sensor can measure pH of low buffering capacity solutions (e.g., a solution containing of the order of less than 0.2 molar buffer, less than 0.05 molar buffer or less than 0.01 molar buffer or the like) such as water, seawater, saline solutions, pharmaceutical solutions, reference solutions, biological media, aquaculture solutions and/or the like.

In embodiments of the present disclosure, a pH sensor is provided comprising a new set of derivatives/active redox species for the electrochemical determination of pH in unbuffered/low ionic strength media. The derivatives/active redox species are configured to provide for formation of hydrogen bonding through a five or six (6) membered ring containing an oxygen family atom to hydrogen interaction. For example, in some embodiments, a carbon ring containing an oxygen family member, such as, by way of example, an oxygen or sulphur atom, is bonded with a phenol and hydrogen bonding occurs between the oxygen or sulphur atom and the phenol proton.

In embodiments of the present disclosure, the oxygen family member atom forming the hydrogen bonding is freely rotating with respect to the phenol or hydroquinone moiety, it is freely rotating because it is not conjugated with respect to the active redox species, and it is held within an ether bond.

An example of a member of the set of derivatives/active redox species includes 2'-hydroxyflavanone, which is a compound of the following formula:

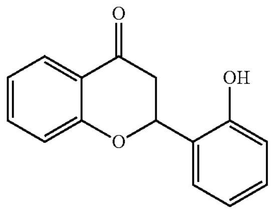 [SMILES: O=C1CC(c2ccccc2O)Oc2ccccc21]

Other examples of redox active species are dihydroxyanthraquinone, dihydroxynapthoquinone, alizarin and derivatives there of and the salicylaldehyde, 2-Hydroxybenzylalcohol, 2-Hydroxypropiophenone, 2,3-Dihydroxybenzaldehyde and 2,5-Dihydroxybenzaldehyde.

In these embodiments, the oxygen atom forming the hydrogen bonding is bound in an ether bond and as such is freely rotating with respect to the α-carbon.

This free rotation allows optimum hydrogen bonding with the phenol proton to occur, unlike previous redox structures where the carbonyl moiety was effectively fixed in position. In some embodiments of the present disclosure, the hydrogen bonding formation is further promoted by the fact that the ether bond forms part of a five or six membered ring, with a carbonyl moiety at the 4-position with respect to the ether oxygen providing a degree of steric constraint on the positioning of the ring with respect to the phenyl ring.

However, as persons skilled in the art will appreciate, the illustrated example shows a structure with properties that can also be provided by other chemistries comprising a substituted oxygen family member in a carbon ring with a hydrogen atom coupled with a further carbon ring, where the two rings are coupled together so as to allow for hydrogen binding with the substituted oxygen family member. As such, it is not possible to provide an exhaustive list of the chemistries that produce the effect. Indeed, the molecules can be bound within a polymeric network. To date, applicant has tested a number of phenol and quinone structures having the freely rotating oxygen family atom positioned in the structure as described and have found that the chemistries provided a discernable redox output that changed with pH in low buffer capacity solutions—where most testing was done in water, seawater and biological media. The stability and response of the tested structures was found to be markedly improved on structures comprising conjugated oxygen atoms or oxygen atoms in a carbonyl structure.

Surprisingly, Applicant has found that working electrodes for electrochemical pH sensors configured for measuring pH of a low buffering capacity solution—such as water, seawater or the like—comprising a redox species as described above and a carbon material do not provide an accurate pH measurement. Applicant have found that this inaccuracy is a result of the carbon material perturbing the pH of the low buffering capacity solution proximal to the working electrode. Applicant has further found that this effect of the carbon material can be removed by coating the working electrode or at least the active surface of the working electrode comprising the redox species and the carbon material with a polymer coating. Applicant has found that the polymer coating prevents, minimizes the perturbation of the pH proximal to the working electrode caused by the carbon material.

In embodiments of the present disclosure, the working electrode comprises at least one polysulfone coated carbon material.

Polysulfone is a collective term for polymers whose repeating units are linked by sulfone groups according to the following formula:

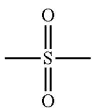

Known polysulfones may comprise the following general structures I to IV $-R-SO_2-$ I

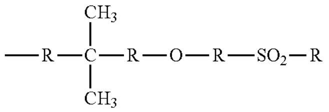 II

-continued $-R-SO_2-R-O-$ III $-R-O-R-SO_2-R-R-SO_2-$ IV wherein R represents alkyl or aryl, and in particular phenyl.

In some embodiments of the present disclosure the polysulfone comprises of structure (II) where R is an phenyl group.

In some embodiments of the present disclosure the working electrode comprises at least one coated carbon material, that is coated with polyphenylsulfide, polyetheretherketone, polyamide derivatives, polyesters and/or any polymeric material with high chemical stability.

In some embodiments of the present disclosure the carbon material is not coated with a fluorinated polymer or is not chemically functionalized with fluorine.

In some embodiments of the present disclosure the carbon material does not comprise any free carboxyl groups.

In some embodiments of the present disclosure, the carbon material comprises any one of, or mixture of, graphite, carbon nanotubes, glassy carbon, Cho, conducting boron doped diamond powder or other conducting carbon materials.

In some embodiments of the present disclosure, the carbon material comprises graphite and/or carbon nanotubes.

In some embodiments of the present disclosure, the carbon material comprises carbon nanotubes.

In some embodiments of the present disclosure, the carbon material comprises multiwall carbon nanotubes.

In some embodiments of the present disclosure, the carbon material comprises carbon nanotubes consisting of more than 90 wt. % carbon. Inevitable impurities, such as metal (ions) may be present in an amount of preferably less than 10 wt. %.

In some embodiments of the present disclosure, the carbon material comprises carbon nanotubes with a length of 3 μm to 12 μm or 5 μm to 9 μm.

In some embodiments of the present disclosure, the carbon material comprises carbon nanotubes with a diameter of 75 nm to 200 nm or 110 nm to 170 nm.

In some embodiments of the present disclosure, the carbon material comprises carbon nanotubes with a length of 3 μm to 12 μm or 5 μm to 9 μm, and a diameter of 75 nm to 200 nm or 110 nm to 170 nm.

In some embodiments of the present disclosure, the carbon material comprises carbon nanotubes with a length of 5 μm to 9 μm and a diameter of 110 nm to 170 nm.

In some embodiments of the present disclosure, the ratio of polysulfone to carbon material is from 1:3 to 6:3.

In some embodiments of the present disclosure, the ratio of polysulfone to carbon material is from 3:3 to 6:3.

In some embodiments of the present disclosure, the ratio of polysulfone to carbon material is 1:3 or 2:3 or 3:3 or 4:3 or 6:3.

A ratio of polysulfone to carbon material of 3:3 or 6:3 shows high sensitivity, accuracy, reproducibility and lifetime properties.

In some embodiments, a voltammetric signal is applied to the working electrode to determine the pH of a solution. In some embodiments of the present disclosure, a reference electrode with a non-active redox species may be used as a reference potential for the working electrode. In some embodiments, the voltammetric signal may be swept between the working electrode and the reference electrode.

In some embodiments, the voltammetric signal may be swept between the working electrode and a counter electrode, with voltage and/or current measured between the counter electrode and the reference electrode.

In some embodiments of the present disclosure, the working electrode comprises an electrode substrate/conductive electrode material coupled with the active redox species, in accordance with embodiments of the present disclosure. The active redox species may be immobilized on the electrode substrate. Such immobilization may in some embodiments comprise: solvent casting the active redox species onto the electrode substrate; screen-printing the active redox species onto the electrode substrate; mixing the active redox species with a conducting powder or the like and containing the mixture in a cavity or the like in the electrode substrate; creating a paste of the active redox species and a conducting material and disposing the paste in a cavity in or on the surface of the electrode substrate; covalently bonding the active redox species with the electrode substrate; chemically and/or physically treating the surface of the electrode; and/or the like.

In some embodiments of the present disclosure, the reference electrode may comprise a chemical species (inactive redox species) that is configured to set a pH of the solution being tested. For example, the chemical species may comprise a chemical structure, moieties and/or the like that is acidic or alkaline in nature, e.g., the chemical species may comprise an acid or a base and/or comprise acidic or basic moieties. In some embodiments, the reference electrode may comprise a redox species that is configured so that a redox potential produced by the redox species does not change with changes to the solution being measured, such as changes in ion concentration, pH and/or the like.

In embodiments of the present disclosure, the active redox species comprises a redox species configured to undergo reduction/oxidation when an electronic signal is applied to the redox species, where the active redox species is sensitive to the presence of hydrogen ions.

In some embodiments, the active redox species of the working electrode is configured to provide an oxidation or reduction potential corresponding to a pH of a solution contacting the working electrode, wherein the solution is a low buffer capacity solution with a molar buffer of less than 0.2, 0.1, 0.05, 0.02. and/or 0.01.

In some embodiments, the active redox species of the working electrode is encapsulated in a polymer. The encapsulating polymer may be configured to facilitate proton transfer from the working electrode/the active redox species to the bulk solution.

In some embodiments, the active redox species is screen printed onto a conducting substrate or dispersed/deposited via solvent evaporation onto a conducting substrate.

In some embodiments, the working electrode is part of an electrochemical sensor for measuring pH in a low buffering capacity solution, where the electrochemical sensor may comprise a reference electrode and a counter electrode.

In some embodiments, where the sensor system comprises an electrochemical sensor the electrochemical sensor may comprise a plurality of working electrodes, wherein a working electrode may comprise a plurality of areas on the working electrode comprising the active redox species, in accordance with embodiments of the present disclosure.

In some embodiments, the reference electrode may comprise an inactive redox species that is not sensitive to pH.

In other embodiments, the reference electrode may comprise an active redox reference species that is sensitive to pH and sets the pH of the local environment of the low buffering capacity solution proximal to the reference electrode.

In some embodiments, the electrochemical sensor may comprise a potentiostat configured to sweep a voltammetric signal between the working electrode and a counter electrode so as to provide for oxidation/reduction of the active redox species on the working electrode.

In some embodiments, the active redox species on the working electrode comprises a monomeric species and a potential of the working electrode is swept oxidatively or held at a significantly oxidizing potential to initiate oxidation of the monomeric species to form electroactive dimers, trimers and/or polymers of the active redox species.

BRIEF DESCRIPTION OF THE DRAWINGS

FIG. 2 shows square wave voltammograms (SWV) and calibration plot in IUPAC standard buffers and $CO_2$ bubbled seawater in 2'-hydroxyflavanone-carbon composite using carboxylated-nanotubes.

EXAMPLES

Figure 1:
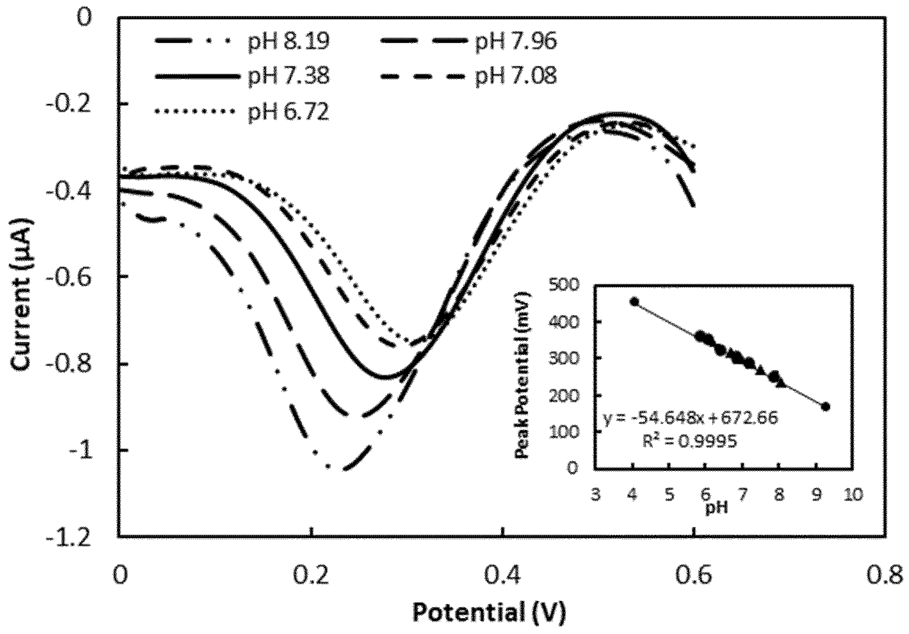
FIG. 1 shows square wave voltammograms (SWV) and calibration plot in IUPAC standard buffers and $CO_2$ bubbled seawater in 2'-hydroxyflavanone-carbon composite using A) old batch, A-1) additional data set of old batch and B) new batch of multi-walled nanotubes.
Figure 1:
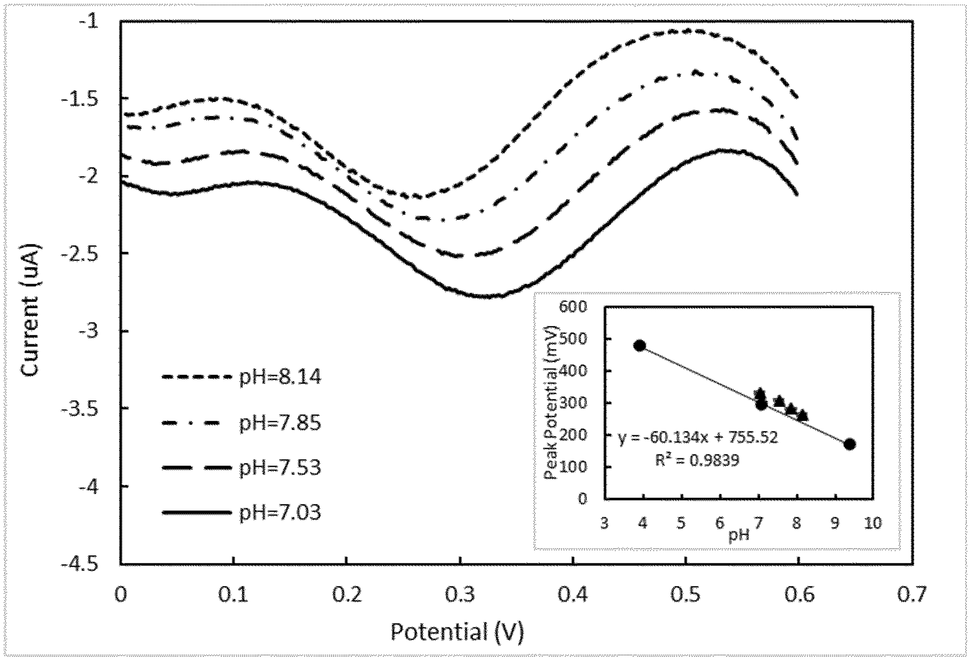

The present invention is now further illustrated in several examples. The examples should not be considered as limiting the invention in any way.

Experimental Set Up:

Reagents:

All chemicals were purchased from Sigma-Aldrich and used without further purification (unless specified). Standard IUPAC buffer solutions (pH 4, 7, 9) were prepared as follows: pH 4.07, 0.05 M potassium hydrogen phthalate; pH 6.86, 0.025 M potassium dihydrogen phosphate and sodium phosphate dibasic; pH 9.23, 0.05 M sodium tetraborate, in deionized water (Hexeal, UK). 0.1 M KCl was added to all buffers as the supporting electrolyte.

Sea water, H2Ocean Natural Reef Salt, was purchased from Maidenhead Aquatics (UK) in which 1 Kg of this salt was dissolved in 25 L of water. For the sea water calibrations, different concentrations of $CO_2$ were bubbled into a constantly stirred sea water solution, and the corresponding pH was measured using the standard glass electrode.

Apparatus:

Electrochemical measurements were performed using an Ana Pot potentiostat (Zimmer & Peacock, UK) with a standard three-electrode configuration in which carbon composite electrode was used as working electrode, a carbon counter and an Ag/AgCl (BASi, USA) used as the reference electrode. All square wave voltammetry (SWV) was conducted using the following parameters: frequency=100 Hz, step potential=1 mV, amplitude=20 mV, no pre-treatment.

Absolute pH measurements were performed using a standard glass electrode (Sensorex, California, USA). The pH meter was calibrated using Reagecon buffers of pH 4.01±0.01, pH 7.00±0.01 and pH 10.01±0.01 (Reagecon Diagnostics Ltd., Ireland) prior to each measurement. Measurement of the pH was carried out on each freshly made solution. All the experiments were carried out at 20±1° C.

Preparation of Composite Electrodes:

The composite electrodes, comprised of 2'-hydroxyflavanone, Nafion® perfluorinated resin solution and multi-walled carbon nanotubes (outside diameter 110-170 nm×L 5-9 μm and carbon basis greater than 90%), with and without a coating of polysulfone of the general formula II as described above, wherein R is a phenyl group (in beaded form with a molecular weight of 22,000 g/mol), which was previously dissolved in dichloromethane (DCM). RX771C/HY1300 epoxy resin (purchased from Robnor ResinLab Ltd) was used as a binder. COOH-functionalized graphitized multi-walled carbon nanotubes (30-50 nm outside diameter, purchased from Cheap Tubes, USA) were used for some electrodes instead of multi-walled nanotubes.

Polysulfone of the general formula II as described above, wherein R is a phenyl group, was dissolved in DCM using an ultrasonic bath for 15 min. Once it was completely dissolved, a known weight-to-weight ratio of multi-walled carbon nanotube, which was previously ground in a mortar until the powder was fine, was added to the dissolved solution. The mixture was dried at room temperature. Flavanone compound was dissolved in Nafion® as e.g. described in Q. Tang, Z. Shan, L. Wang, X. Qin, K. Zhu, J. Tian, X. Liu, Nafion coated sulfurecarbon electrode for high performance lithiumesulfur batteries, Journal of Power Resources 246 (2014) 253-259.)

Once both polysulfone-CNT and flavanone-Nafion® mixtures were completely dry, they both were ground in a mortar separately for 5 minutes, until the mixtures were fine enough to mix homogeneously. Then, both mixtures were combined and thoroughly mixed. Once the final mixture was completely homogeneous, it was carefully mixed with the epoxy-resin, to form a carbon epoxy paste.

The resulting mixture was then packed into a recess (5 mm length and 1 mm diameter) of a PEEK™ manufactured body. Electrical connection was made using a brass rod (4 cm length, 2 mm diameter). The electrode was cured at 125° C. during 1 hour to produce the solid carbon composite electrode.

Results

It is known that a Nafion® coated 2'-hydroxyflavanone based carbon nanotube composite electrode is suitable for pH sensing in both buffered and unbuffered media.

Briefly, the resulting electropolymerized 2'-hydroxyflavanone-electrode was found to respond accurately to pH, showing an excellent sensitivity. Non-functionalized multi-walled carbon nanotubes offered desirable chemical and physical properties and contributed to electron-transfer reactions, leading to a sensitive pH composite, as presented in FIG. 1A, which shows the square wave voltammograms (SWV) and calibration of the carbon composite electrode in $CO_2$ gassed sea water, and as presented in an additional data set in FIG. 1A-1, which also shows the square wave voltammograms (SWV) and calibration of the carbon composite electrode in $CO_2$ gassed sea water. As can be seen from the plot of peak potential as a function of pH, the sensitivity in unbuffered media overlays that of the response obtained in IUPAC media, as expected.

The experiment was then repeated using a previously unopened bottle of carbon nanotubes in the composite electrode. Although the batch numbers from the supplier were the same and no treatment of the carbon nanotubes occurred prior to manufacture of the electrodes, a contradictory response was observed in unbuffered media. FIG. 1B details the corresponding square wave voltammetry recorded in sea water with varying concentrations of $CO_2$ alongside the plot of peak potential as a function of pH for both the sea water experiment and those obtained using standard IUPAC buffers.

Comparing the voltammetric response of the two supposedly identical electrodes shows that there is a stark contrast between them. In FIG. 1A, and in the additional data set presented in FIG. 1A-1, sharp, well defined reduction waves are observed which respond linearly with pH, however, the data presented in FIG. 1B shows broad reduction waves which show no obvious trend to changes in the pH of the solution. This is confirmed in the insert plots, unlike the data presented in FIG. 1A, and the additional data set presented in FIG. 1A-1, where Nernstian responses of peak potential as a function of pH are observed in both IUPAC and sea water/$CO_2$ solutions, the results in FIG. 1B, show that this is not the case. The electrode followed a Nernstian response in the IUPAC buffered solutions but no trend in the low buffered sea water/$CO_2$ solutions. Analysis of the baseline current shows that this is significantly increased with the electrodes produced from the new carbon nanotubes, confirming the new batch impacts the electrochemical response.

In this latter case the sensing behavior is perturbed in low buffer media, this can be attributed (vide infra) to the presence of carboxyl functional groups on the surface of the electrode. In unbuffered media, these can set the pH of the solution local to the electrode surface to the pKa of the functionality at the surface. It has been previously reported that carboxylated graphene exhibited two acidic pKa's of 4 and 6.25. Extrapolation of the peak potential obtained in sea water using the IUPAC trendline data, shown in FIG. 1B, shows that the pH in the vicinity of the electrode is 6.82 for a sea water whose pH value taken by a glass electrode was 8.08. This is consistent with the literature data and suggests the new batch of CNTs have a higher degree of carboxylated sites compared to the previous batch.

In another experiment, COOH-functionalised multi-walled nanotubes replaced the non-functionalised in the carbon composite formulation. As expected, the resulting potential in seawater was shifted to 0.299V (FIG. 2) leading to a higher peak potential than anticipated according to IUPAC standard buffers calibration (see FIG. 2, Insert). Thus, it is confirmed the hydrophilicity imparted from carboxyl functional groups is electrochemically affecting the system.

Figure 3:
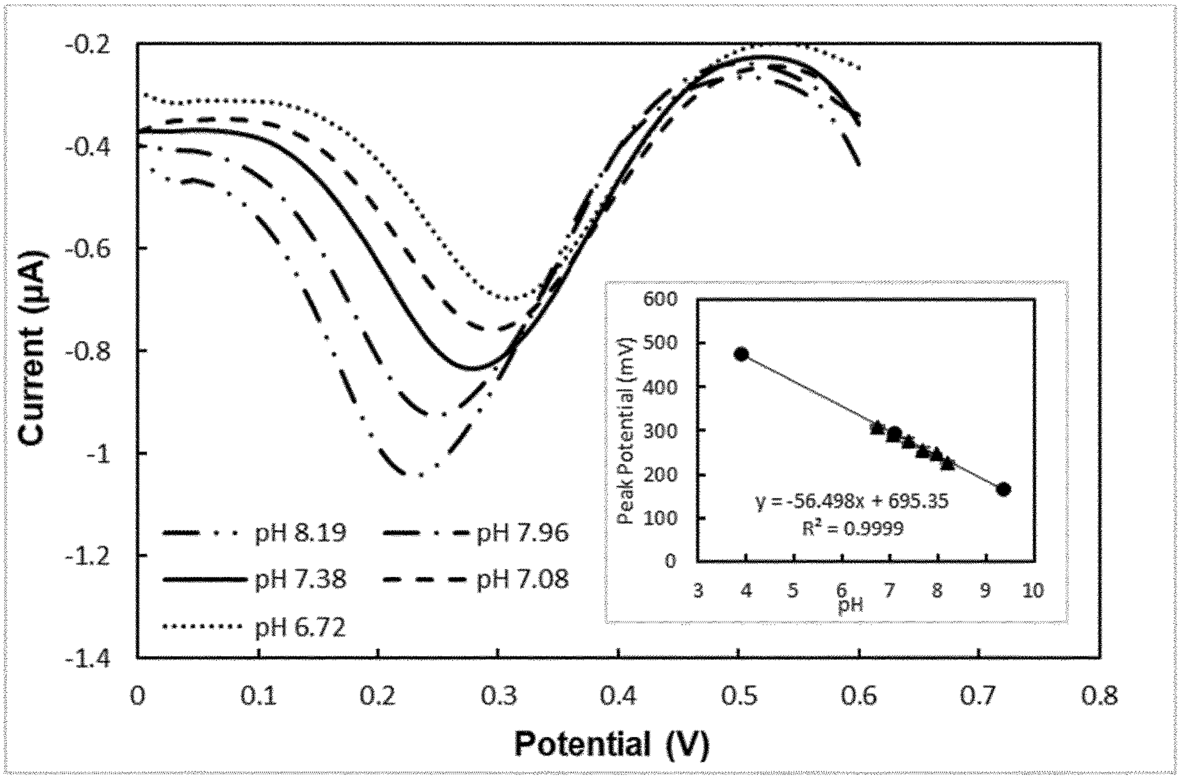
FIG. 3 shows square wave voltammograms (SWV) and calibration plot of polysulfone-coated nanotubes based 2'-hydroxyflavanone electrode in IUPAC standard buffers and $CO_2$ bubbled seawater.

This issue can be of importance when developing sensors for low buffered media, where the underlying carbon substrate can interfere with the local environment. To this end, the CNTs were coated with a polymer, effectively nullifying the interaction between the functional groups and the aqueous phase. An electrode was next prepared using polysulfone-coated CNTs and the resulting square wave voltammograms for the electrode placed in a sea water solution to increasing $CO_2$ concentrations is shown in FIG. 3. Reassuringly the voltammetric response is consistent with that shown in FIG. 1B, furthermore the peak potential response as a function of pH overlays that obtained in IUPAC buffered media (FIG. 3, Insert) with a sensitivity to pH of 56.5 mV/pH unit. The sea water calibration plot is based on the average of 4 electrodes and the standard deviation is shown by the error bars. Furthermore, a comparison of the baseline currents of the coated nanotubes with the results in FIG. 1, reveals the coated electrodes produce currents similar to that shown in FIG. 1A, and the additional data set shown in FIG. 1A-1. This is consistent with the exposed carboxylic acid groups of the uncoated batch (FIG. 1B) significantly increasing the capacitative charging currents of the electrodes compared to the coated system.

Furthermore, carboxylated-CNTs were coated with polysulfone of the general formula II as described above, wherein R is an phenyl group (average Mn ~22,000 by MO, beads), to confirm the surface functional groups effect, and the voltammetric response was consistent with that obtained with the coated uncarboxylated CNTs (not shown). The peak potential in seawater providing a pH of 7.95, using an IUPAC standard buffer calibration line analogous to the that shown in FIG. 3 (insert), for a sea water pH value of 7.96 using a glass electrode. This confirms that the coating was able to effectively nullify the functional groups of the CNT in sea water, avoiding perturbation of the pH in the media locale to the electrode surface.

The polysulfone-CNT ratio was studied, to assess the influence of the coating in the pH sensing system and ascertain the optimum ratio. Table 1 compares the sensitivity and the linearity to pH as the polysulfone:CNT ratio is increased in the sea water/CO2 solutions, based on 4 electrodes, compared to the response in buffered media. Under optimum conditions the sea water/CO2 sensitivity will match that of the buffer concentration.

At low concentration of polysulfone, 1:3 PSU-CNT ratio, a slight improvement in pH sensing sensitivity of the sensor was recorded indicating partial polysulfone coverage of the nanotubes. However, the sensitivity did not match that of the buffer solution meaning that the functional groups present on the CNT surface still impacted the pH of the locale environment. Increasing the polysulfone concentration to a ratio of 2:3 significantly improved the sea water calibration with a consistent sensitivity between IUPAC standard buffers and sea water recorded. This is consistent with the polysulfone providing complete coverage of the CNT and effectively nullifying the surface functionality of the CNT. Further increasing the polysulfone concentration to a 3:3 polysulfone-CNT ratio showed excellent sensitivity and reproducibility across all the electrodes. As with the 2:3 ratio the pH trend in the sea water solution followed that of the IUPAC standard. Nevertheless, when it was increased to a 4:3 ratio, an enhancement in sensitivity was seen for both IUPAC buffer and sea water calibrations, however the reproducibility between electrodes decreased. In addition, it was found that the excess amount of polysulfone impacted in the storage conditions of the electrodes. Under dry storage dehydration of the polysulfone layer was seen. Although submerging in sea water again, the electrodes hydrated, the peak potential was shifted compared to that of a freshly polished electrode with a 3:3 ratio.

TABLE 1

A comparison of the sensitivity and intercept of different amounts of polysulfone in nanotube for flavanone pH sensors, based on 4, 7, 9 IUPAC standard buffers and sea water calibrations using $CO_2$.

| Polysulfone-CNT ratio | Sea water/$CO_2$ | | | 4, 7, 9 IUPAC Standard Buffers | | |
| | Sensitivity (mV/pH) | Redox Potential at pH 0 (mV/pH) | $R^2$ | Sensitivity (mV/pH) | Redox Potential at pH 0 (mV/pH) | $R^2$ |
|---|---|---|---|---|---|---|
| 1:3 | −48.28 ± 14.63 | 629.74 ± 112.02 | 0.957 ± 0.017 | −52.66 ± 1.77 | 650.84 ± 17.79 | 0.999 ± 0.001 |
| 2:3 | −57.37 ± 1.48 | 696.25 ± 14.10 | 0.993 ± 0.004 | −55.72 ± 1.00 | 684.11 ± 9.61 | 0.999 ± 0.0002 |
| 3:3 | −54.99 ± 0.52 | 680.61 ± 6.95 | 0.991 ± 0.003 | −56.50 ± 0.69 | 695.35 ± 3.75 | 1.0 ± 0.0001 |
| 4:3 | −61.63 ± 3.17 | 716.04 ± 22.85 | 0.962 ± 0.028 | −61.75 ± 0.16 | 711.30 ± 2.13 | 0.999 ± 0.0004 |

Figure 4:
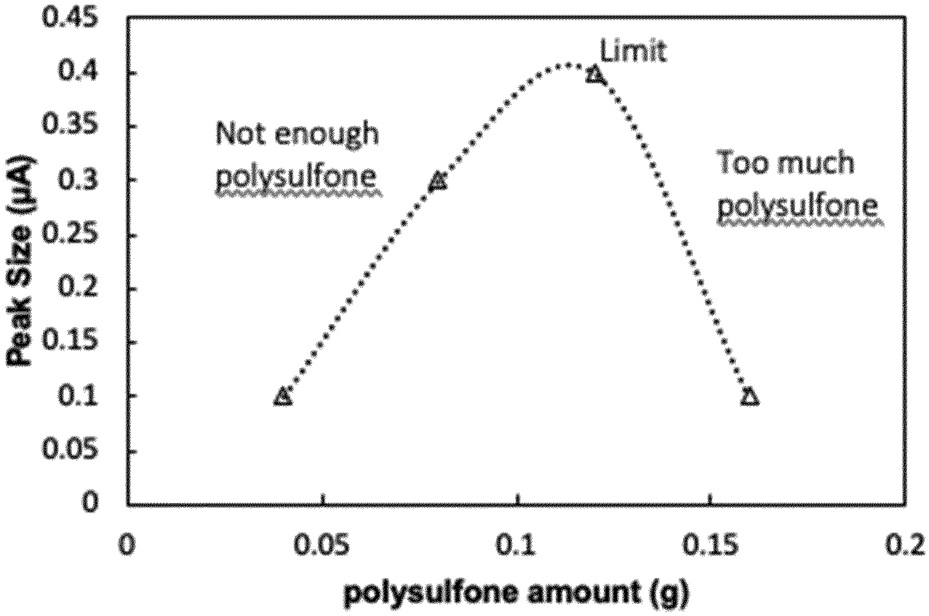
FIG. 4 shows peak size obtained from SWV for polysulfone-coated nanotubes based pH sensor over polysulfone amount in the formulation.

FIG. 4 details the peak current of the electropolymerised layer as a function of polysulfone CNT ratio. Increasing the polysulfone concentration to 3:3, revealed a rise in the peak current consistent with the lifetime data presented in Table 2. At higher concentrations the peak current dropped along with the lifetime of the sensor. All these results show that the 3:3 polysulfone-CNT ratio was the optimum formulation. Finally, it should be noted that the conductivity of the electrodes was not affected at all by polysulfone concentration, with all of them presenting a conductivity of around 80Ω.

For the lifetime test (Table 2), Square Wave Voltammetry was run for each electrode, with a delay of three mins between each scan. At low concentration of polysulfone, 1:3 polysulfone-CNT ratio, partial polysulfone coverage of the nanotubes was demonstrated, so the lifetime test of this ratio was not performed. Increasing the polysulfone concentration to a 2:3 ratio, around 700 scans of lifetime was observed. As well as an improvement in sensitivity and calibration, a significant improvement of 3,000 scans in lifetime was observed when increasing the polysulfone amount to a 3:3 ratio. Nevertheless, when increasing polysulfone concentration further to 3:4, a slight decrease in lifetime was seen, which is attributed to an excess in the coating amount, that is confirmed after the dehydration in dry conditions.

TABLE 2

Lifetime comparison of different amounts of polysulfone in nanotube for flavanone pH sensors.

| Polysulfone-CNT ratio | Lifetime (scans) |
|---|---|
| 1:3 | — |
| 2:3 | ~700 |
| 3:3 | ~3000 |
| 4:3 | ~1500 |

Figure 5:
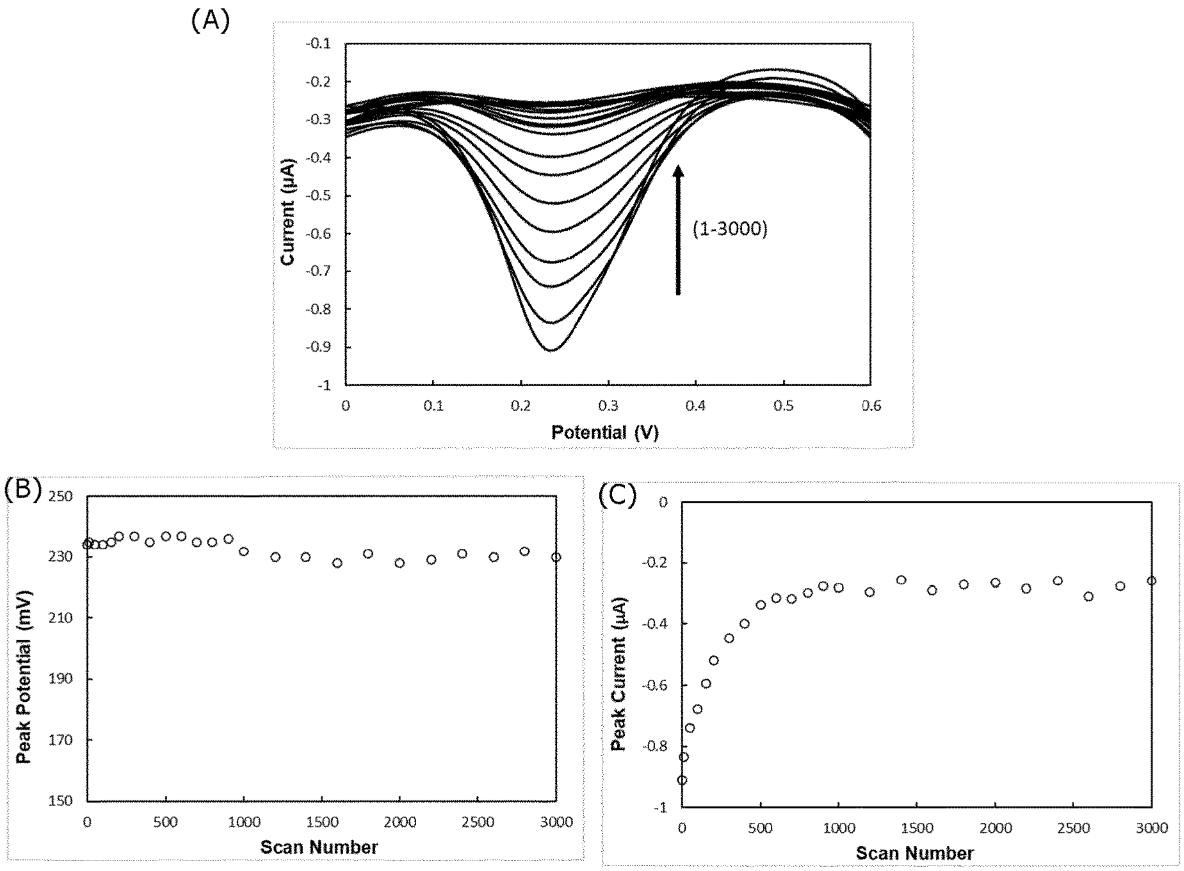
FIG. 5 shows lifetime studies for polysulfone-coated nanotube pH electrodes by (A) continuously SWV testing and analysis of (B) peak potential and (C) peak current over scans.

FIG. 5A details the continuous reductive Square Wave Voltammetry signals of the electropolymerized 3:3 ratio electrode when placed in a sea water. As presented in Table 2, a lifetime of 3,000 scans was shown. The peak potential remained constant during all the scans, as detailed in FIG. 5B, whilst the peak current decreases over the first 700 scans and the remained constant after that (FIG. 5C). The electrode calibration was then checked after the 3000 scans in sea water/CO2 solution. The results were shown to overlay providing a regression data of y=55.83x+683.89, being pH value and peak potential for x,y values respectively, which is consistent with the results prior to the lifetime studies, y=−54.98x+680.61 (from Table 1), and hence, demonstrates that lifetime scanning does not impact the calibration of the sensor.

Finally, the reproducibility of the optimum formulation, 3:3 ratio, was tested across 17 electrodes prepared from different batches of CNT's. They were performed and tested in IUPAC buffers and $CO_2$ bubbled sea water solutions. An average in sensitivity of −54.98±0.96 and intercept of 685.5±7.8 was obtained for sea water calibrations, and a sensitivity of −55.57±0.94 and intercept of 687.4±8.9 for IUPAC standard buffers. A considerable improvement in stability, accuracy and reproducibility is provided by using polysulfone-coated nanotubes compared to the uncoated systems.

Erroneous surface functionalization of multi-walled nanotubes effect was thereby successfully corrected by using polysulfone as a polymer coating, leading to an accurate flavanone based pH sensing system in low buffered media. The resulting sensor was found to provide a Nernstian response in buffered and unbuffered media, making it suitable for deployment as a pH sensor.

It has been demonstrated that carboxyl functional groups formed from the oxygen reaction in highly reactive chemical sites on the surface of the nanotubes induce a local acidic pH, which perturbates the pH sensing behavior of the electrode. Polysulfone was successfully incorporated and surface functionalities were effectively nullified, providing an accurate pH sensing behavior in unbuffered media. The effect of the functional groups was confirmed with the addition of COOH-functionalized carbon nanotubes to the formulation instead of non-functionalized nanotubes, where the same pH perturbation behavior was seen.

Different polysulfone-CNT ratios were studied, and 3:3 showed high sensitivity, accuracy, reproducibility and lifetime properties. The resulting electrode showed a very accurate sensitivity to pH, increasing the peak potential linearly when decreasing pH, with a sensitivity to pH of 55 mV/pH unit in both buffered and sea water, and a standard deviation of 0.95 mV/pH unit between 17 electrodes.

The invention claimed is:

1. A composite working electrode comprising:

at least one polysulfone coated carbon material, and at least one active redox species comprising an oxygen family atom bound in a ring structure, wherein:

the ring structure is substituted with a carbon ring, and a moiety containing a hydrogen atom is attached to the carbon ring such that it is configured to provide for hydrogen bonding with the bound oxygen family atom;

wherein the active redox species on the working electrode comprises a monomeric species that is suitable for oxidation to form electroactive dimers, trimers and/or polymers of the active redox species when a potential of the working electrode is swept oxidatively or held at a significantly oxidizing potential.

2. The composite working electrode according to claim 1, wherein the carbon material comprises any one of, or mixture of, graphite, carbon nanotubes, glassy carbon, C60, conducting boron doped diamond powder or other conducting carbon materials.

3. The composite working electrode according to claim 1, wherein the carbon material comprises multiwall carbon nanotubes.

4. The composite working electrode according to claim 1, wherein weight of the polysulfone is approximately equal to weight of the carbon material.

5. The composite working electrode according to claim 1, wherein ratio by weight of polysulfone to carbon material is from 1:3 to 6:3.

6. The composite working electrode according to claim 1, wherein the active redox species is configured to provide an oxidation or reduction potential corresponding to a pH of a solution contacting the working electrode, wherein the solution is a low buffer capacity solution with a molar buffer of less than 0.25, 0.2, 0.1, 0.05, 0.02, and/or 0.01.

7. The composite working electrode according to claim 1, wherein the oxygen family atom is an oxygen atom, a sulphur atom or a selenium atom.

8. The composite working electrode according to claim 1, wherein the hydrogen atom is part of a hydroxyl group attached to the carbon ring.

9. The composite working electrode according to claim 1, wherein the carbon ring comprises a phenol.

10. The composite working electrode according to claim 1, wherein the ring structure comprises an electron withdrawing or an electron donating group.

11. The composite working electrode according to claim 1, wherein the carbon ring comprises an electron withdrawing or an electron donating group.

12. The composite working electrode according to claim 1, wherein the active redox species comprises a hydroxyflavanone.

13. The composite working electrode according to claim 1, wherein the active redox species comprises 2'-hydroxyflavanone.

14. An electrochemical sensor, comprising a composite working electrode according to claim 1.

15. The electrochemical sensor according to claim 14, wherein the electrochemical sensor is configured for measuring pH in a low buffering capacity solution.

16. The electrochemical sensor according to claim 15, further comprising a reference electrode, wherein the reference electrode comprises an active redox reference species that is sensitive to pH and sets the pH of the local environment of a low buffering capacity solution proximal to the reference electrode.

17. The electrochemical sensor according to claim 14, further comprising a reference electrode and a counter electrode.

18. The electrochemical sensor according to claim 17, wherein the reference electrode comprises an inactive redox species that is not sensitive to pH.

19. The electrochemical sensor according to claim 14, further comprising:

a counter electrode, and a potentiostat configured to sweep a voltammetric signal between the working electrode and the counter electrode so as to provide for oxidation/reduction of an active redox species on the working electrode.

* * * * *